US005464301A

United States Patent [19]
Kramer

[11] Patent Number: 5,464,301
[45] Date of Patent: Nov. 7, 1995

[54] ROTARY LATCH

[75] Inventor: Joel M. Kramer, Fountain Valley, Calif.

[73] Assignee: The United States of America as represented by the Administrator of the National Aeronautics and Space Administration, Washington, D.C.

[21] Appl. No.: 264,087

[22] Filed: Jun. 21, 1994

[51] Int. Cl.$^6$ ..................................................... F16B 7/00
[52] U.S. Cl. ........................ 403/322; 403/325; 403/327; 403/79; 244/161
[58] Field of Search ................................ 403/321, 322, 403/354, 326, 327, 328, 315, 325, 380, 349, 49, 79; 288/401, 402, 360, 361, 396; 244/161

[56] References Cited

U.S. PATENT DOCUMENTS

| | | | |
|---|---|---|---|
| 2,450,527 | 10/1948 | Smith et al. | 285/177 |
| 3,253,310 | 5/1966 | McCarthy | 403/326 X |
| 3,280,439 | 10/1966 | McCarthy | 403/322 X |
| 3,362,050 | 1/1968 | McCarthy | 403/325 X |
| 3,674,287 | 7/1972 | Selley | 285/7 |
| 4,249,799 | 2/1981 | Iglesias | 350/257 |
| 4,404,714 | 9/1983 | Duran | 403/322 X |
| 4,544,324 | 10/1985 | Hornung | 414/785 |
| 4,836,707 | 6/1989 | Myers | 403/322 |
| 4,887,929 | 12/1989 | Hale | 403/354 X |
| 4,943,015 | 7/1990 | Geyer et al. | 244/161 |
| 4,943,182 | 7/1990 | Hoblingre | 403/328 X |
| 4,976,399 | 12/1990 | Bay et al. | 244/161 |
| 5,046,691 | 9/1991 | Hart | 244/158 R |
| 5,167,464 | 12/1992 | Voellmer | 403/13 |
| 5,188,381 | 2/1993 | Kho | 280/37 |

Primary Examiner—Eric K. Nicholson
Assistant Examiner—Harry C. Kim
Attorney, Agent, or Firm—Hardie R. Barr

[57] ABSTRACT

A rotary latch is disclosed, including a hollow, cylindrical outer member and a concentrically arranged inner rotor. The rotor is rotatable within the outer cylindrical member. The outer cylindrical member includes a pair of aligned openings at a cylinder first end facing a latch pin. The rotor includes a pair of aligned slots at a rotor first end facing the latch pin. Slot extensions are provided in the rotor, the slot extensions extending generally perpendicularly to the slots and generally parallel to the rotor first end. In a first position, the outer cylindrical member openings and the rotor slots are aligned to allow receipt of the latch pin. In a second position, the openings and the slot extensions are aligned thereby engaging the latch pin within a closed area defined by the rotor slot extensions and the outer cylinder openings.

25 Claims, 2 Drawing Sheets

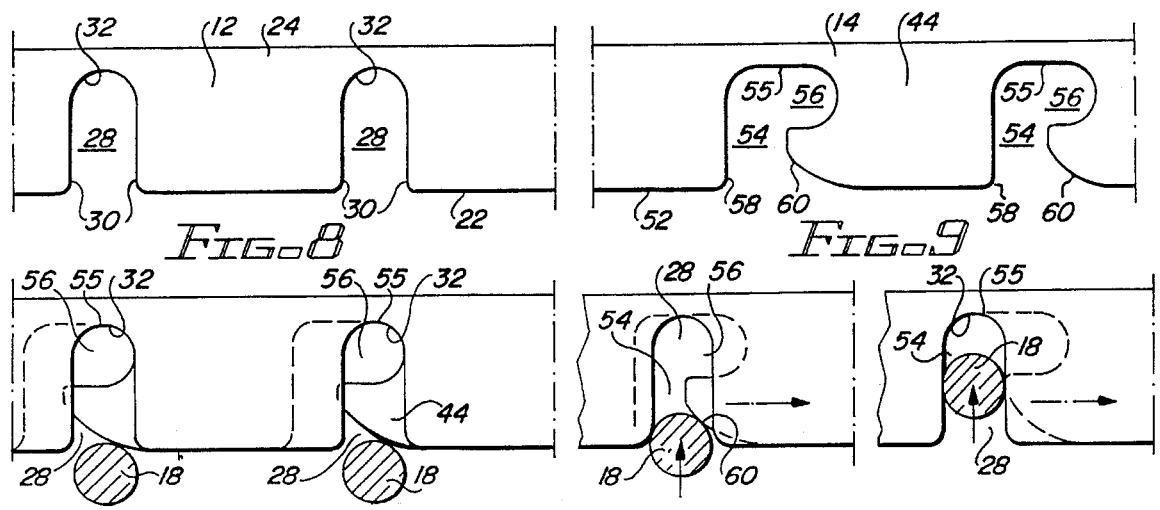
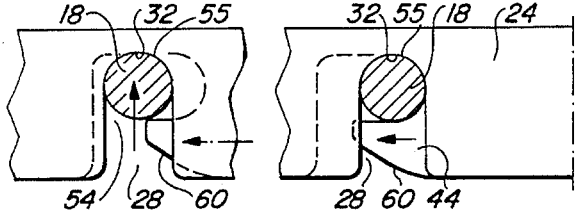
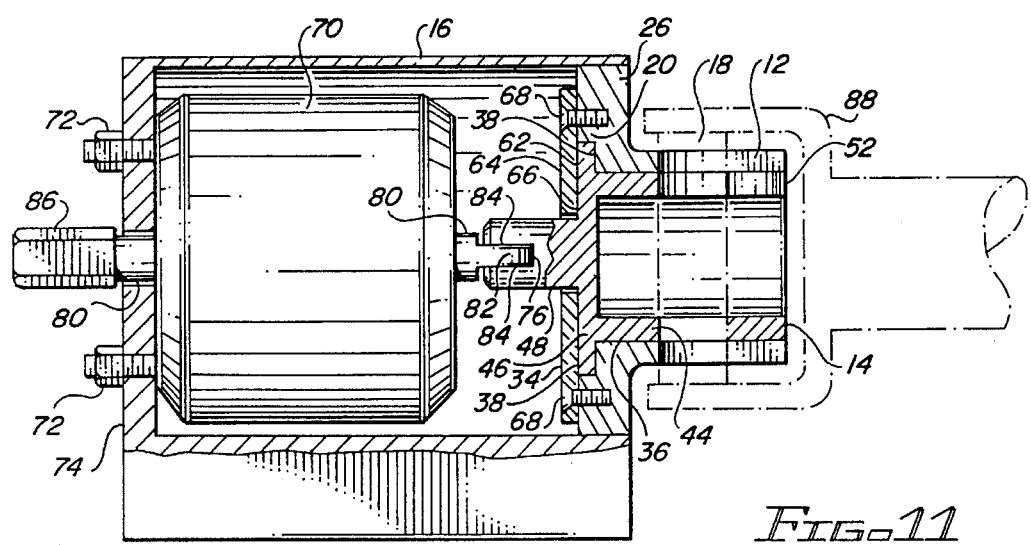

ROTARY LATCH

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

The rotary latch of the present invention relates to the field of latching mechanisms and particularly to positive engagement latching mechanisms.

BACKGROUND OF THE INVENTION

The subject rotary latch was designed as a launch restraint for use on aeronautical components. However, the rotary latch may be utilized in a multitude of industrial, commercial and residential applications.

In aeronautical applications, latch systems often involve over-the-center linkages to grab and retain latch pins or pawls. Such devices typically have a number of moving parts. Generally, devices having a relatively large number of moving parts are relatively expensive to develop and manufacture. Further, such devices are not easily adapted to passive capture of the latch pin. In aeronautical applications, such devices are complicated by the necessity of a design that prevents premature release of a payload.

The prior art includes rotary latch mechanisms and latching mechanisms having aeronautical applications as disclosed in the patents identified.

Smith et al. U.S. Pat. No. 2,450,527 discloses a spring loaded, semi-automatic coupling device for conduits and cables. Spiralling bayonet slots and cooperative pins are provided to engage a male joining member and a female joining member. The female member includes a spring-biased rotatable sleeve and a spring-biased locking pin.

Selley U.S. Pat. No. 3,674,287 discloses a coupling device for vacuum cleaner components, the device including an inner tubular member, an outer tubular member and an exterior ring member. Pins extending exterior of the inner member are received in recesses in the inner tubular member and in angled slots in the outer tubular member. Upon rotation of the ring member an angled inner slot surface moves the pins in an axial direction, out of the recesses.

Kho U.S. Pat. No. 5,188,381 discloses a device for attaching a wheel axle to a suitcase, including a recessed area for receiving an axle and a pivoting locking lever. Iglesias U.S. Pat. No. 4,249,799 discloses a connecting mechanism for optical devices. Hornung U.S. Pat. No. 4,544,324 discloses a mechanism for removably securing forks to a forklift.

The following patents disclose latching devices having aeronautical applications: Myers U.S. Pat. No. 4,836,707; Geyer et al. U.S. Pat. No. 4,943,015; Hart U.S. Pat. No. 5,046,691; Voellmer U.S. Pat. No. 5,167,464, and Bay et al. U.S. Pat. No. 4,976,399.

It is an object of the present invention to provide a rotary latch providing positive capture of the item to be restrained by totally enclosing the latch pin.

It is a further object of this invention to provide a rotary latch having the characteristic that latch loading will not result in premature release of the latch pin.

It is a further object of this invention to provide a rotary latch that can be remotely operated.

It is a further object of this invention to provide a rotary latch that can be remotely operated or manually operated.

It is a further object of this invention to provide a rotary latch allowing a relatively wide area for the latch pin to engage a latch opening while providing a relatively close fit of the latch pin within the closed latch.

The foregoing and other objects of the present invention are accomplished with a rotary latch, including a hollow, cylindrical outer member and a concentrically arranged inner rotor. The rotor rotatably fits within the outer cylindrical member. The outer cylindrical member includes a pair of aligned openings at a first end of the cylinder wall facing a latch pin. The rotor includes a pair of aligned slots at a first end of the rotor facing the latch pin. Slot extensions are provided in the rotor, the slot extensions extending generally perpendicularly to the slots and generally parallel to the rotor first end. In a first position, the outer cylindrical member openings and the rotor slots are aligned to allow receipt of the latch pin. In a second position, the openings and the slot extensions are aligned thereby engaging the latch pin within a closed area defined by the rotor slot extensions and the outer cylinder openings.

BRIEF DESCRIPTION OF THE DRAWINGS

FIG. 8 illustrates a linear view of an outer cylinder wall segment.

FIG. 9 illustrates a linear view of a receiver wall segment.

FIGS. 10A through 10E depict, in linear views, relative positions of cylinder wall openings and receiver slots.

FIG. 11 illustrates a cross-sectional side view of the rotary latch.

DESCRIPTION OF THE PREFERRED EMBODIMENT

Figure 1:
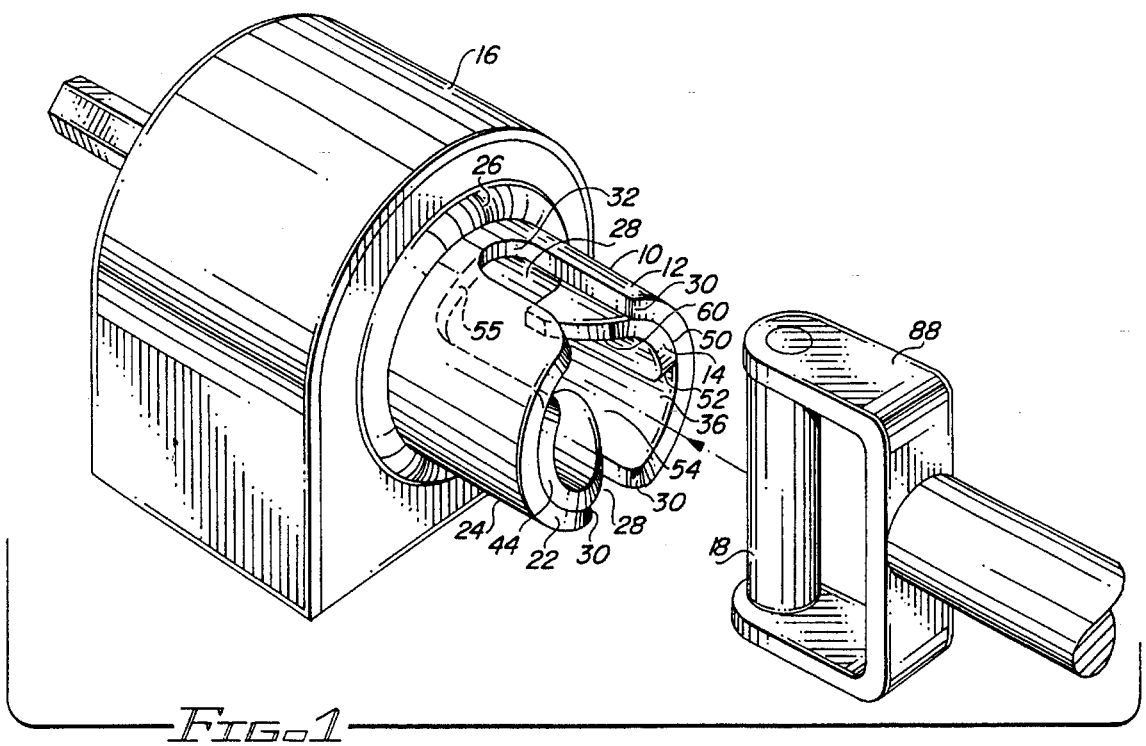
FIG. 1 illustrates an isometric view of the rotary latch of the present invention and a disengaged latch pin and clevis.

Referring first to FIG. 1, the rotary latch 10 of the present invention is depicted in a preferred embodiment. The rotary latch 10 includes an outer cylinder 12 and an inner rotor 14. The outer cylinder 12 is supported on a housing 16. Latch pin 18 and clevis 88 are depicted in FIG. 1 disengaged from the outer cylinder 12 and the rotor 14.

Figures 2, 4, 6:
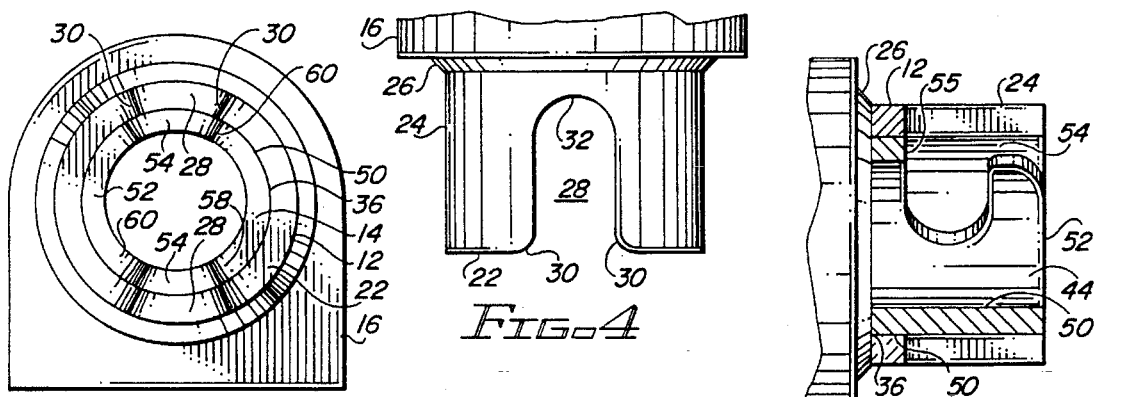
FIG. 2 illustrates an end view of the rotary latch of the present invention.
FIG. 4 illustrates a top view of the outer cylinder of the rotary latch.
FIG. 6 illustrates a partial cross-sectional side view of the rotary latch.

Referring to FIG. 1, FIG. 4 and FIG. 11, outer cylinder 14 includes a hollow, cylindrical body 24 having a first end 22 and a distal second end 20. A flange 26 extends radially from cylindrical body 24 at end 20. The flange 26 is connected along its periphery to housing 16.

Two spaced openings 28 are provided in first end 22. The openings 28 are radially spaced 180° apart. Each opening 28 extends axially into body 24 and perpendicularly to first end 22. Each opening 28 extends toward end 20 and each opening 28 terminates at an opening end 32 intermediate cylinder end 22 and flange 26.

Curvilinear shoulders 30 are provided at the interfaces of each opening 28 with cylinder end 22. Each opening end 32 is curved, the radius of curvature being slightly greater than the radius of curvature of the latch pin 18.

Referring to FIG. 1, FIG. 6, and FIG. 11, rotor 14 includes a hollow, cylindrical latch receiver 44 having a first end 52, a rotor wall 46 distal from rotor end 52, and a connector 48 extending from rotor wall 46 opposite receiver 44.

Receiver first end 52 is aligned with outer cylinder end wall 22. Receiver end 52 and outer cylinder wall end 22 both face the latch pin 18.

Receiver 44 is sized such that the receiver 44 outer surface 50 fits closely within the inner surface 36 of outer cylinder 12. The fit is such that receiver 44 may readily rotate within outer cylinder 12, which rotation may be enhanced by lubrication means (not shown). The lubrication means may include a self-lubricating lining or a conventional lubricant.

Two spaced slots 54 are provided in the first end 52. The spaced slots 54 are radially space 180° apart. Each spaced slot 54 extends axially into receiver 44 generally perpendicularly to first end 52. Each slot 54 extends into receiver 44 toward rotor wall 46 to slot a end 55. Slot ends 55 are each coincident with ends 32 of openings 22. A slot extension 56 extends from each of the slots 54. Each slot extension 56 extends at an angle of approximately ninety degrees (90°) to slots 54. Each slot extension 56 therefore extends parallel to end 52. Each slot end 55 comprises a side wall of each slot extension 56. Each slot extension 56 extends in the same radial direction in receiver 44 from each slot 54.

Each spaced slot 54 is provided with a curvilinear shoulder 58 and an inclined curvilinear surface 60 at the interface of such slot 56 with end 52. Each inclined surface 60 is located on the same radial side of slot 54 as slot extension 56.

Referring to FIG. 11, indentation 34 is provided at end 20 of cylinder 12 adjacent inner surface 36. Indentation 34 defines a radially-extending rim 38 of inner surface 36 at end 20.

Rotor wall 46 extends transversely to the axis of receiver 44 and radially beyond the outer surface 38 of receiver 44 thereby defining a flange 62. Flange 62 extends into indentation 34.

Still referring to FIG. 11, a connector 48 extends from rotor wall 46 opposite receiver 44. Connector 48 comprises a rod located centrally of rotor wall 46.

Rotor retainer 64 comprises a generally flat disk having a diameter greater than the diameter of rotor wall 46 and having a central aperture 66. Aperture 66 is wider than the diameter of connector 48 to allow connector 48 to extend therethrough. Retainer 64 is fixedly attached to end 20 of outer cylinder 12 by screws 68. Retainer 64 restrains rotor 14 and flange 62 within inner surface 36 and indentation 34. As flange 62 extends between rim 38 and retainer 64, retainer 64 and rim 38 prevent axial movement of rotor 14 in relation to outer cylinder 12.

Solenoid 70 is fixedly positioned in housing 16 by bolts 72 extending through housing rear wall 74. Solenoid 70 is axially aligned with rotor 14 and outer cylinder 12. Solenoid 70 includes a central shaft 80 located centrally of solenoid 70 and aligned with connector 48 of rotor 14.

Solenoid 70 is connected to an electrical power source by conventional electrical connectors (not shown in the drawings). Shaft 80 is rotatable upon application of electrical power to the solenoid 70. In the preferred embodiment, shaft 80 is bi-directionally operable.

A channel 76 is provided in connector 48 at its end 78 distal from rotor wall 46. A first end 82 of shaft 80 includes generally parallel flat side surfaces 84, the end 82 and side surfaces 84 extending interior of channel 76 of connector 48. Rotational movement of shaft 80 therefore induces rotational movement of connector 48 and rotor 14.

A second end 86 of shaft 80 extends from the solenoid 70 opposite connector 48. End 86 includes a plurality of flattened side surfaces defining a polygonal cross-sectional transverse section of end 86. The polygonal cross-sectional area allows engagement of end 86 by a socket, handle or wrench (not shown) for manual override of the rotation of shaft 80 by solenoid 70.

The solenoid 70 comprises a commercially-available rotary solenoid having an internally-mounted torsion spring (not shown) engaging the shaft 80 and biasing shaft 80 in a predetermined orientation. As a solenoid 70 having such internal torsion spring is commercially available, the details of construction of same are omitted from the present disclosure. A preferred predetermined orientation of shaft 80 is one in which the rotary latch 10 is closed; that is, slots 54 of rotor 14 are angularly displaced from openings 28 of outer cylinder 12 such that the inclined surfaces 60 of receiver 44 are aligned with the openings 28 and slot extensions 56 are aligned with openings 28. Such preferred orientation is depicted in FIG. 1, FIG. 5, FIG. 10A and FIG. 10E.

Referring again to FIG. 1, latch pin 18 is connected to a clevis 88. Clevis 88 is connected to the object (not shown) to be secured by rotary latch 10. Housing 16 of rotary latch 10 is fixedly mounted on a mounting surface (not shown) of a second object to be secured (not shown).

Referring to FIG. 2, an end view of the housing 16, outer cylinder 12 and rotor 14 is depicted with openings 28 aligned with slots 54. Openings 28 and shoulders 30 are provided at end 22 of cylinder 12. Slots 54, each having a shoulder 58 and an inclined surface 60, are provided at end 52 of receiver 44.

Figures 3, 5, 7:
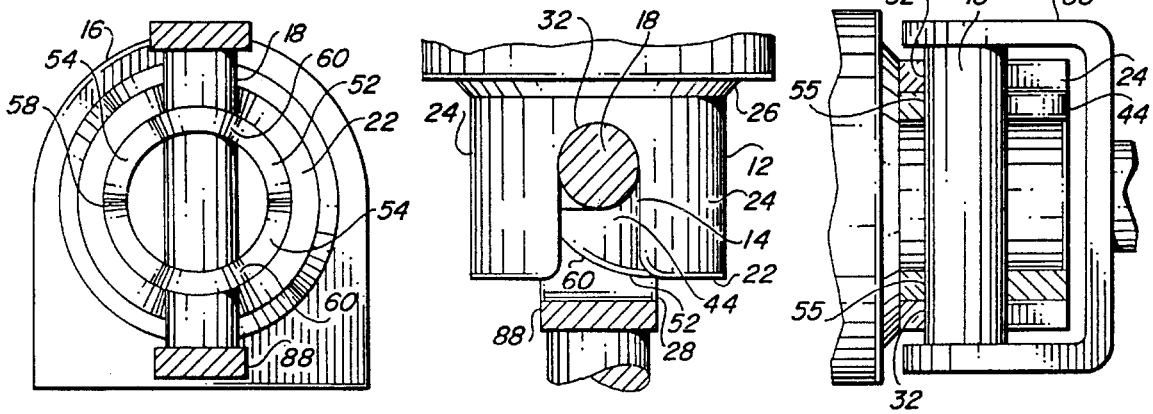
FIG. 3 illustrates an end view of the rotary latch with the latch pin engaged.
FIG. 5 illustrates a top view of the outer cylinder and rotor of the rotary latch with the latch pin engaged.
FIG. 7 illustrates a partial cross-sectional side view of the rotary latch with the latch pin engaged.

Referring to FIG. 3, an end view of the housing 16, outer cylinder 12, rotor 14 and latch pin 18 is depicted with the latch pin 18 in latching engagement within the rotary latch 10. A segment of receiver 44 extends exterior of latch pin 18, latch pin 18 being retained from axial movement by receiver 44. FIG. 5 depicts a top view of the rotary latch 10 in latching engagement with the latch pin 18 as in FIG. 3. Latch pin 18 is shown in cross-section retained within perpendicularly oriented opening 28 and slot extension 56. FIG. 7 depicts a partial cross-sectional side view of the rotary latch 10 in latching engagement with latch pin 18 as depicted in FIG. 3 and FIG. 5. Latch pin 18 abuts opening ends 32 and slot ends 55.

OPERATION OF THE INVENTION

FIG. 8 depicts a linear view of a segment of the cylinder wall 24 showing openings 28 and shoulders 30. FIG. 9 depicts a linear view of a segment of the receiver 44 showing slots 54, slot extensions 56, slot shoulders 58 and inclined surfaces 60.

FIGS. 10A through 10E depict linear views of cylinder wall 24 segments and receiver 44 segments in varying orientations.

FIG. 10A depicts the openings 28, the slots 54, and the slot extensions 56 in relative location when first engaged by latching pin 18. In FIG. 10A latching pin 18 is depicted in two cross-sectional segments. FIG. 10A therefore depicts the rotary latch 10 in a closed position with the latch pin 18 at initial engagement with the inclined surfaces 60.

FIG. 10B depicts the relative location of an opening 28, a slot 54 and a slot extension 56 after initial engagement of the rotary latch 10 with the latch pin 18. The latch pin 18 and the rotary latch 10 are engaged with such force that the thrust of the latch pin 18 against the inclined surfaces 60 is sufficient to create rotation of the rotor 14 and receiver 44, the radial thrust against inclined surfaces 60 being sufficient to overcome the thrust of the torsion spring (not shown) internal of solenoid 70. FIG. 10C depicts the further rotation, relative to FIG. 10B of the receiver 44 in response to the force of the latch pin 10. FIG. 10C depicts the receiver 44 in an open position with the openings 28 and the slots 54 aligned.

FIG. 10D depicts cylinder wall 24 and receiver 44 segments with the latch pin 18 at the end 32 of opening 28 and at end 55 of slot 54. Upon travel of the latch pin 18 to ends 32 and 55, the tension spring provided within solenoid 70 biases the rotor 14 to the closed position.

FIG. 10E depicts cylinder wall 24 and receiver 44 segments in a closed position with the latch pin 18 locked within the openings 26 and the slot extensions 56. Upon engagement of the latch pin 18 in such closed position, the latch pin 18 is restrained from axial movement by the rotor 14, which rotor 14 is in turn restrained from axial movement by engagement of the flange 62 between rim 38 and rotor retainer 64. In such closed position, the latch pin 18 is restrained from radial or transverse movement by the outer cylinder 12. The latch pin 18 is therefore restrained by the perpendicular intersection of openings 22 and slot extensions 56. The resistance to axial or transverse movement of the latch pin 18 within the rotary latch 10 is therefore independent of the biasing force exerted by the torsion spring of solenoid 70.

The solenoid 70 may be operated to rotate the rotor 14 to an open position or to a closed position, solenoid 70 operable at sufficient force to overcome the force of the torsion spring. Shaft 80 may further be manually rotated by engaging end 86 with a suitably-configured wrench or handle (not shown).

ALTERNATE EMBODIMENTS

The embodiment of the rotary latch 10 described is particularly suited for use as a launch restraint or for releasable attachment of components in aeronautical applications. The disclosure is readily adaptable to alternative embodiments suitable to a Variety of latching applications.

By way of example, an embodiment may provide for manual operation of the rotor 14, eliminating the solenoid 70. In such an embodiment, the rotor 14 may still be maintained in a preferred orientation by a torsion spring or other biasing means.

By way of further example, an embodiment may provide for the rotor 14 to be fixedly supported on a mounting surface and the outer cylinder 12 to be rotatably supported on said rotor 14. Such an embodiment may be particularly appropriate for a manually-operated latching mechanism.

While the present invention has been described in terms of a preferred embodiment, it should be understood that within the scope of the appended claims the invention may be practiced otherwise than as specifically described.

I claim:

1. A rotary latch comprising:

a first hollow cylinder;

a second cylinder rotatably and concentrically disposed in said first cylinder;

said second cylinder being axially immobile with respect to said first cylinder;

said first cylinder having opposed openings in a first cylinder end;

said second cylinder including at least one slot in a second cylinder first end;

at least one slot extension provided in said second cylinder, said at least one slot extension extending angularly from said at least one slot;

said at least one slot aligned with said openings in a first position of said second cylinder in relation to said first cylinder;

said at least one slot extension aligned with said openings in a second position of said second cylinder in relation to said first cylinder;

said at least one slot offset from said openings in said second position;

whereby a latch pin is receivable in said openings and said at least one slot in said first position, and said latch pin is restrained in said openings and said at least one slot extension in said second position.

2. The latch according to claim 1, including:

said at least one slot extension extending at substantially a 90° angle from said at least one slot.

3. The latch according to claim 1, including:

said second cylinder comprising a hollow cylinder having a cylinder wall;

said at least one slot comprising two opposed slots in said second cylinder wall;

said at least one slot extension comprising opposed slot extensions in said second cylinder wall.

4. The latch according to claim 1, including:

restraint means operatively engaging said first cylinder and said second cylinder to limit axial movement of said second cylinder in relation to said first cylinder.

5. The latch according to claim 4, including:

said restraint means including a radially-extending flange cooperatively engaging a flange-receiving channel, one of said first cylinder and said second cylinder provided with said flange and the other of said first cylinder and said second cylinder provided with said channel.

6. The rotary latch according to claim 1, including:

biasing means for biasing said first cylinder and said second cylinder in a preferred relative position.

7. The rotary latch according to claim 1, including:

said openings provided with curvilinear shoulders at interfaces of said openings with said first cylinder first end;

said at least one slot provided with curvilinear shoulders at interfaces of said at least one slot with said second cylinder first end.

8. The rotary latch according to claim 6, including:

said at least one slot having at least one inclined surface intermediate a slot wall and the second cylinder first end;

whereby said second cylinder is rotationally moveable responsive to a thrust force from said latch pin, said rotational movement opposing the bias of said biasing means.

9. A latch mechanism comprising:

a hollow cylinder having a cylinder wall;

a rotor rotatably disposed within said cylinder;

said rotor being axially immobile with respect to said cylinder;

opposed openings provided in a first end of said cylinder wall;

at least one slot provided in a first end of said rotor;

at least one slot extension provided in said rotor, said at least one slot extension extending angularly from said at least one slot;

said at least one slot aligned with said openings in a first position of said rotor in relation to said cylinder;

said at least one slot extension aligned with said openings in a second position of said rotor in relation to said cylinder;

said at least one slot offset from said openings in said second position;

whereby a latch pin is receivable in said openings and said at least one slot in said first position, and said latch pin is restrained in said openings and said at least one slot extension in said second position.

10. The latch according to claim 9, including:

said at least one slot extension extending at a 90° angle from said at least one slot.

11. The latch according to claim 10, including:

each of said openings aligned on a chord extending through a central axis of said cylinder; and said at least one slot aligned on a chord extending through a central axis of said rotor.

12. The latch according to claim 9, including:

restraint means operatively engaging said cylinder and said rotor to restrain said rotor from axial movement in relation to said cylinder.

13. The latch according to claim 12, including:

said restraint means including a radially-extending flange and a flange-receiving channel in cooperative engagement, one of said rotor and said cylinder provided with said flange and the other of said rotor and said cylinder provided with said channel.

14. The latch according to claim 12, including:

said restraint means comprising a flange extending radially from said rotor;

said flange rotatably received within an annular channel defined at least in part by an annular opening in said cylinder.

15. The latch according to claim 14, including:

said annular channel defined on a first side by an annular opening in said cylinder and defined on a second side by a surface to which the cylinder is attached.

16. The latch according to claim 12, including:

biasing means for biasing said rotor and said cylinder in a preferred relative position.

17. The latch according to claim 16, including:

said cylinder fixedly attached to a mounting surface, said rotor rotatably supported in said cylinder; and rotation means for rotating said rotor in relation to said cylinder.

18. The latch according to claim 16, including:

said rotor attached to a mounting surface, said cylinder rotatably supported on said rotor; and rotation means for rotating said cylinder in relation to said rotor.

19. The latch according to claim 12, including:

said openings having curvilinear shoulders at the interface of said openings and said cylinder wall;

said at least one slot having curvilinear shoulders at the interface of said at least one slot with a rotor end;

whereby receipt of said latch pin in said openings and said at least one slot is facilitated by said curvilinear shoulders.

20. The latch according to claim 12, including:

said at least one slot each provided with at least one inclined surface intermediate a slot wall and a rotor end;

whereby a thrust force of a latch pin results in rotational movement of said rotor, said rotational movement opposite a force vector of said biasing means.

21. A latch mechanism, comprising:

a hollow cylinder having a cylinder wall and a central axis;

a cylindrical rotor having a rotor wall;

said rotor axially aligned within said cylinder and rotatable within said cylinder;

said rotor being axially immobile with respect to said cylinder;

restraint means operatively engaging said rotor and said cylinder to limit axial movement of said rotor in relation to said cylinder:

a pair of opposed openings provided in said cylinder wall, said openings extending axially from a cylinder wall first end;

a pair of opposed slots provided in said rotor, said slots extending axially from a rotor wall first end;

slot extensions provided in said rotor walls, said slot extensions extending at substantially a 90° angle from said slots;

said slots aligned with said openings in a first position of said rotor in relation to said cylinder;

said slot extensions aligned with said openings in a second position of said rotor in relation to said cylinder;

said slots offset from said openings in said rotor second position;

whereby a latch pin is receivable in said openings and said slots in said first position, and said latch pin is restrained in said openings and said slot extensions in said second position.

22. The latch according to claim 21, including:

said restraint means including a radially-extending flange and a flange-receiving channel in cooperative engagement, one of said rotor and said cylinder provided with said flange and the other of said rotor and said cylinder provided with said channel.

23. The latch according to claim 21, including:

said restraint means comprising a flange extending radially from said rotor;

said flange rotatably received within an annular channel defined at least in part by an annular opening in said cylinder.

24. The latch according to claim 21, including:

biasing means for biasing said rotor and said cylinder in a preferred relative position.

25. The latch according to claim 24, including:

said openings having curvilinear shoulders at the interface of said openings and said cylinder wall;

said slots having curvilinear shoulders at the interface of said slots with a rotor end;

said slots each provided with at least one inclined surface intermediate a slot wall and a rotor end;

whereby receipt of said latch pin in said openings and said slots is facilitated by said curvilinear shoulders and a thrust force of the latch pin results in rotational movement of said rotor, said rotational movement opposite the force vector of said biasing means.

* * * * *